(12) United States Patent
Linser

(10) Patent No.: US 8,899,551 B2
(45) Date of Patent: Dec. 2, 2014

(54) OBLIQUE MATING SURFACES IN A VALVE ASSEMBLY

(71) Applicant: Fisher Controls International LLC, Marshalltown, IA (US)

(72) Inventor: Mark J. Linser, Marshalltown, IA (US)

( * ) Notice: Subject to any disclaimer, the term of this patent is extended or adjusted under 35 U.S.C. 154(b) by 0 days.

(21) Appl. No.: 13/775,088

(22) Filed: Feb. 22, 2013

(65) Prior Publication Data

US 2013/0221260 A1    Aug. 29, 2013

Related U.S. Application Data

(60) Provisional application No. 61/603,127, filed on Feb. 24, 2012.

(51) Int. Cl.
*F16K 1/00* (2006.01)
*F16K 47/08* (2006.01)
*F16K 13/00* (2006.01)

(52) U.S. Cl.
CPC .................. *F16K 13/00* (2013.01); *F16K 47/08* (2013.01); *F16K 27/104* (2013.01)
USPC . 251/324; 251/367; 137/625.33; 137/625.37; 285/332; 285/406

(58) Field of Classification Search
USPC .......................... 251/127, 318, 366, 367, 324; 137/625.33, 625.37–625.39; 285/332, 285/406
See application file for complete search history.

(56) References Cited

U.S. PATENT DOCUMENTS

| | | | |
|---|---|---|---|
| 3,894,716 A * | 7/1975 | Barb .............................. | 251/127 |
| 4,366,833 A * | 1/1983 | Grotloh .......................... | 137/334 |
| 4,834,340 A * | 5/1989 | Girdley ......................... | 251/368 |
| 5,700,014 A * | 12/1997 | Morita et al. ................. | 277/614 |
| 6,637,452 B1 | 10/2003 | Alman | |
| 2003/0197144 A1 | 10/2003 | Nguyen | |
| 2005/0000577 A1 | 1/2005 | Alman et al. | |
| 2009/0320931 A1 | 12/2009 | Wears | |
| 2010/0301253 A1 | 12/2010 | Perrault et al. | |

FOREIGN PATENT DOCUMENTS

WO    WO-2012/012951 A1    2/2012

OTHER PUBLICATIONS

International Search Report and Written Opinion for Application No. PCT/US2013/027526, dated Jun. 26, 2013.
International Preliminary Report on Patentability for International Application No. PCT/US2013/027526, dated Aug. 26, 2014.

* cited by examiner

*Primary Examiner* — John K Fristoe, Jr.
*Assistant Examiner* — Marina Tietjen
(74) *Attorney, Agent, or Firm* — Marshall, Gerstein & Borun LLP

(57) ABSTRACT

A valve assembly includes a valve body having a body recess and a bonnet including a bonnet recess having a bonnet mating surface. The valve assembly further includes a valve cage disposed within an interior of the valve body, the valve cage including a body portion extending along a longitudinal axis and a circumferential mating protrusion extending from an outer surface in a transverse direction, the mating protrusion including an upper mating surface and a lower mating surface. The upper mating surface is disposed within the bonnet recess to be aligned with the bonnet mating surface, and the lower mating surface is disposed within the body recess to be aligned with the body mating surface, wherein the upper and lower mating surface are not parallel. Accordingly, clamping forces acting on the mating protrusion include a longitudinal and tangential component, allowing for increased clamping forces without plastically deforming the mating protrusion.

15 Claims, 4 Drawing Sheets

US 8,899,551 B2

OBLIQUE MATING SURFACES IN A VALVE ASSEMBLY

FIELD OF THE INVENTION

The present invention relates generally to valve assemblies. More specifically, the present invention relates to a mating assembly to secure a valve cage within a valve assembly.

BACKGROUND OF THE INVENTION

In typical control valve assemblies, a valve cage may be at least partially disposed within a passageway formed in the interior of the valve body, and the valve cage may be adapted to guide a valve plug that is slidingly received into a central bore of the cylindrical valve plug. The valve cage typically has a mating protrusion disposed at or adjacent to a top portion of the valve cage, and the mating protrusion may extend around a circumference of an outer surface of the valve cage. The mating protrusion is typically formed of a planar top surface, a planar bottom surface longitudinally offset from the top surface, and a cylindrical end surface that extends from a terminal end of the top surface to a terminal end of the bottom surface. The top surface and the bottom surface are each parallel to a transverse reference plane that is normal to a longitudinal axis that is coaxially aligned with the cylindrical outer surface of the valve cage.

To couple the valve cage to the control valve assembly, a top portion of the mating protrusion is disposed within an annular bonnet recess formed at a bottom portion of the bonnet, and a bottom portion of the mating protrusion is disposed within an annular body recess formed on a top portion of the valve body. When the bonnet is coupled to the valve body by a plurality of bolts, a planar bonnet mating surface engages the top surface of the mating protrusion and a planar body mating surface engages the bottom surface of the mating protrusion. Because the bonnet mating surface and the body mating surface are parallel to the top surface and the bottom surface, respectively, of the mating protrusion, the compressive force resulting from the clamping act on the planar top surface in a direction normal to the top surface, and also acts on the planar bottom surface in a direction normal to the bottom surface. Because the clamping load acts normal to the top and bottom surfaces of the mating protrusion, the maximum allowable clamping force must be less than the maximum force that can be applied to the material without resulting in plastic deformation of the material.

BRIEF SUMMARY OF THE DISCLOSURE

In accordance with one exemplary aspect of the present invention, a valve assembly includes a valve body having an inlet, an outlet, a passageway between the inlet and the outlet, and an annular body recess formed on a top portion of the valve body. The body recess includes a body mating surface. The valve assembly further includes a bonnet removably secured to the top portion of the valve body, and the bonnet has an annular bonnet recess formed on a bottom portion of the bonnet, the bonnet recess including a bonnet mating surface. The valve assembly also includes a valve cage disposed at least partially within the passageway, the valve cage having an elongated body portion extending along a longitudinal axis and having an outer surface. The valve cage also has a circumferential mating protrusion extending from the outer surface along a transverse plane that is normal to the longitudinal axis, and the mating protrusion includes an upper mating surface and a lower mating surface. The upper mating surface of the mating protrusion is disposed within the bonnet recess such that the upper mating surface is aligned with and adjacent to the bonnet mating surface, and the lower mating surface of the mating protrusion is disposed within the body recess such that the lower mating surface is aligned with and adjacent to the body mating surface. In addition, the upper mating surface and the lower mating surface of the mating protrusion of the valve cage are not parallel.

In accordance with a further exemplary aspect of the present invention, a valve cage adapted to be disposed at least partially within a passageway of a control valve includes a body portion extending along a longitudinal axis such that the body portion has a first end and a second end that is longitudinally separated from the first end. The body portion has an outer surface and an inner surface inwardly offset from the outer surface. The valve cage further includes a mating protrusion extending from the outer surface along a transverse plane that is normal to the longitudinal axis, and the mating protrusion includes an upper mating surface and a lower mating surface. The upper mating surface of the mating protrusion is adapted to be disposed within a first recess formed in a first portion of the control valve such that the upper mating surface is aligned with and adjacent to a mating surface of the first recess, and the lower mating surface of the mating protrusion is adapted to be disposed within a second recess formed in a second portion of the control valve such that the lower mating surface is aligned with and adjacent to a mating surface of the second recess. In addition, the upper mating surface and the lower mating surface of the mating protrusion of the valve cage are not parallel.

DETAILED DESCRIPTION OF THE INVENTION

Figure 1:
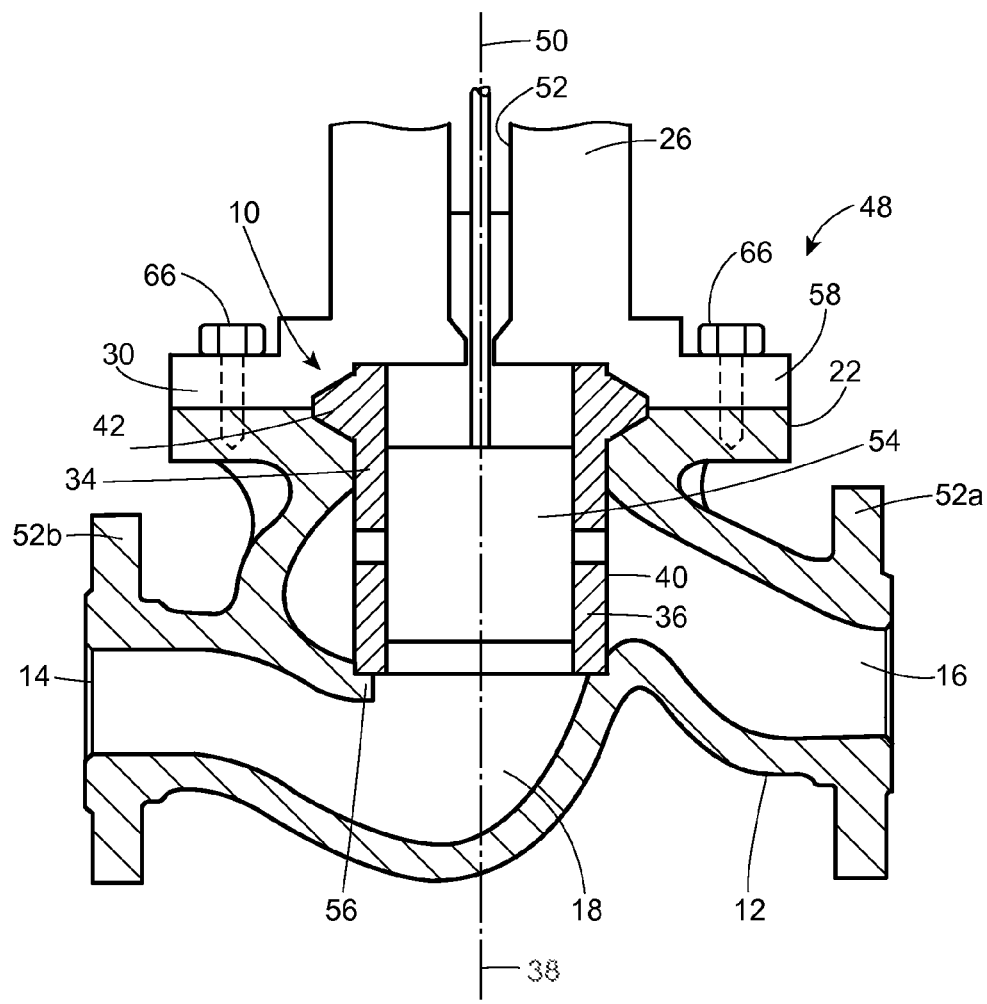
FIG. 1 is a sectional side view of an embodiment of a control valve including the valve assembly of the present disclosure.
Figure 2:
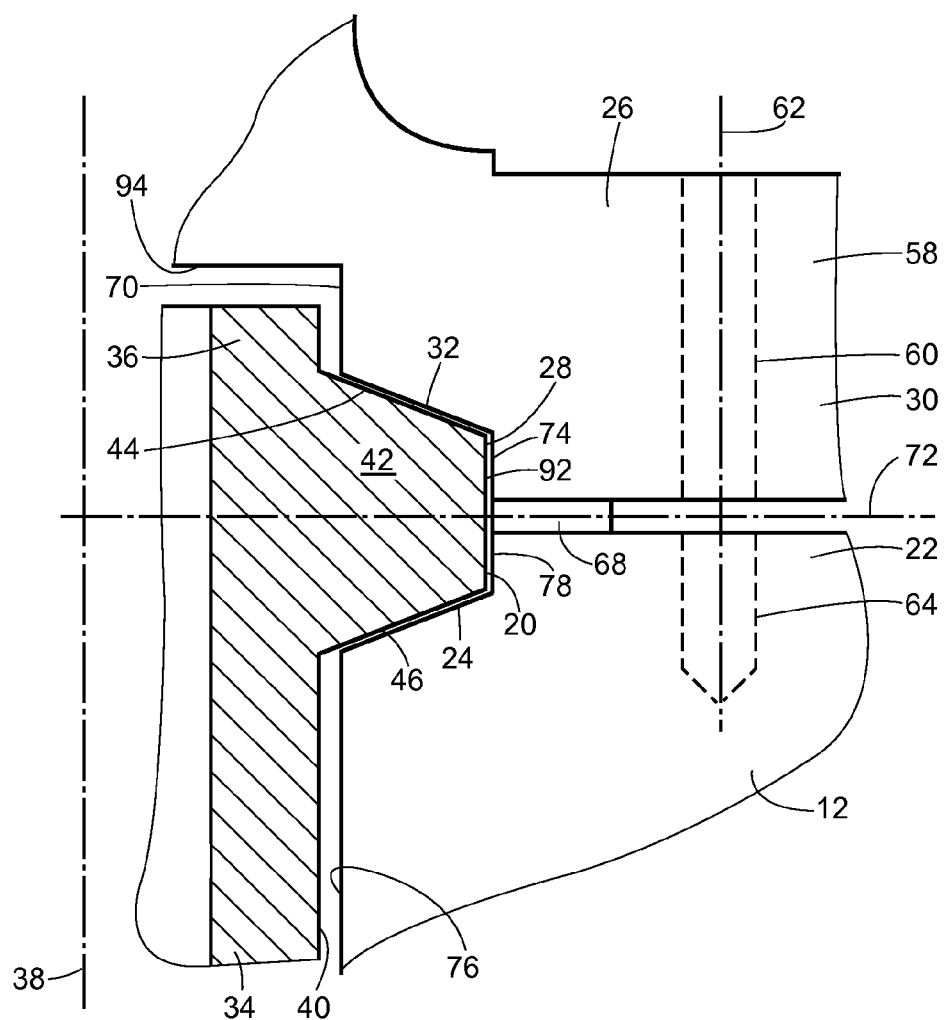
FIG. 2 is a partial sectional side view of an embodiment of the valve assembly of the present disclosure.

As illustrated in FIGS. 1 and 2, a valve assembly 10 includes a valve body 12 having an inlet 14, an outlet 16, and a passageway 18 between the inlet 14 and the outlet 16. An annular body recess 20 is formed on a top portion 22 of the valve body 12, and the body recess 20 includes a body mating surface 24, as illustrated in FIG. 2. Referring again to FIGS. 1 and 2, the valve assembly 10 also includes a bonnet 26 removably secured to the top portion 22 of the valve body 12. The bonnet 26 includes an annular bonnet recess 28 formed on a bottom portion 30 of the bonnet 26, and the bonnet recess 28 including a bonnet mating surface 32, as illustrated in FIG. 2. The valve assembly 10 further includes a valve cage 34 disposed at least partially within the passageway 18, and the valve cage 34 includes an elongated body portion 36 extending along a longitudinal axis 38. The valve cage 34 also includes an outer surface 40 and a circumferential mating protrusion 42 extending from the outer surface 40 along a transverse plane 72 (illustrated in FIG. 2) that is normal to the longitudinal axis 38. As illustrated in FIG. 2, the mating protrusion 42 includes an upper mating surface 44 and a lower mating surface 46. The upper mating surface 44 of the mating protrusion 42 is disposed within the bonnet recess 28 such that the upper mating surface 44 is aligned with and adjacent to the bonnet mating surface 32, and the lower mating surface 46 of the mating protrusion 42 is disposed within the body recess 20 such that the lower mating surface 46 is aligned with and adjacent to the body mating surface 24. In addition, the upper mating surface 44 and the lower mating surface 46 of the mating protrusion 42 of the valve cage 34 are not parallel.

So configured, the lower mating surface 46 and the upper mating surface 44 are disposed at an angle relative to the transverse plane 72, and therefore both a longitudinal force component and a transverse force component act on each of the upper mating surface 44 and the lower mating surface 46 when the mating protrusion is clamped between the bonnet 26 and the valve body 12. As such, the longitudinal force component may be less than the yield force (resulting in only elastic deformation of the upper mating surface 44), but the addition of the transverse force component vector allows the total resultant clamping force to be substantially greater than the yield force, thereby resulting in an increased safety factor.

Turning now to FIG. 1, the valve assembly 10 of the present disclosure may be used with a cage-guided control valve 48. The control valve 48 may include the valve body 12, and the bonnet 26 mounted to the valve body 12 may be mounted to the valve body in a manner that will be described in more detail below. A valve stem 50 may be disposed within a stem bore 52 that extends through the bonnet 26 along the longitudinal axis 38. The valve stem 50 may be coupled to a valve actuator (not shown) that longitudinally displaces the valve stem 50 in a known manner. The passageway 18 may be defined in the interior of the valve body 12 between the inlet 14 and the outlet 16. By way of flanges 52a, 52b, the valve body 12 may be connected into a flow pipeline (not shown) to incorporate the passageway 18 of the valve body 12 into the flow pipeline. A valve plug 54 may be disposed at an end of the valve stem 50 such that a longitudinal displacement of the valve stem 50 by the valve actuator results in a corresponding longitudinal displacement of the valve plug 54 relative to a valve seat 56 disposed within the passageway 18. As would be understood by someone of ordinary skill in the art, when the valve plug 54 sealingly engages the valve seat 56, fluid is prevented from flowing from the inlet 14 to the outlet 16 of the control valve 50. When the valve plug 54 is longitudinally displaced away from the valve seat 56, fluid may flow from the inlet 14 to the outlet 16 of the control valve 50.

As illustrated in FIGS. 1 and 2, the bottom portion 30 of the bonnet 26 of the valve assembly 10 may include a bonnet flange 58 that extends in a direction normal to the longitudinal axis 38. A plurality of apertures 60 may be circumferentially arrayed around the bonnet flange 58 such that a longitudinal axis of each of the plurality of apertures 60 is parallel to the longitudinal axis 38. The bonnet 26 may be coupled to the valve body 12 such that the bottom portion 30 of the bonnet 26 may be adjacent to the top portion 22 of the valve body 12. So arranged, each of the plurality of apertures 60 extending through the bonnet flange 58 may be coaxially-aligned with a corresponding body aperture 64 that extends at least partially into the valve body 12 along the longitudinal axis 62 of a corresponding one of the plurality of apertures 60. Each body aperture 64 may be at least partially threaded to threadedly engage a fastener 66 (illustrated in FIG. 1) that extends through each of the plurality of apertures 60 to removably secure the bonnet 26 to the valve body 12. An annular gasket 68 may be disposed between the bottom portion 30 of the bonnet 26 the top portion 22 of the valve body 12 to prevent a leakpath from forming in the gap between the bonnet 26 and the valve body 12.

Referring to FIG. 2, the bottom portion 30 of the bonnet 26 may include the bonnet recess 28 that may be circumferentially disposed about a bonnet bore side surface 70. The bonnet recess 28 may extend around the entire circumference of the bonnet bore side surface 70. The bonnet bore side surface 70 may be cylindrical and may be aligned with the longitudinal axis 38. The bonnet recess 28 may be partially defined by the bonnet mating surface 32. The bonnet mating surface 32 may be symmetrically disposed about the longitudinal axis 38. The bonnet mating surface 32 may have a linear cross-sectional shape when viewed normal to the longitudinal axis 38, and the linear cross-sectional shape may be non-parallel to a transverse plane 72 that is normal to the longitudinal axis 38. More specifically, the linear cross-sectional shape of the bonnet mating surface 32 may converge towards the transverse plane 72 as the linear cross-sectional shape extends away from the longitudinal axis 38. The bonnet recess 28 may be further defined by a bonnet recess end surface 74. The bonnet recess end surface 74 may be a cylindrical surface that may be symmetrically formed about the longitudinal axis 38. The bonnet recess end surface 74 may have a linear cross-sectional shape when viewed normal to the longitudinal axis 38, and the linear cross-sectional shape may be normal to the transverse plane 72.

Referring again to FIG. 2, the top portion 22 of the valve body 12 may include a body recess 20 that may be circumferentially disposed about a body bore side surface 76. The body recess 20 may extend around the entire circumference of the body bore side surface 76. The body bore side surface 76 may be cylindrical and may be aligned with the longitudinal axis 38, and the bonnet bore side surface 70 may have the same diameter as the body bore side surface 76. The body recess 20 may be partially defined by the body mating surface 24. The body mating surface 24 may be symmetrically disposed about the longitudinal axis 38. The body mating surface 24 may have a linear cross-sectional shape when viewed normal to the longitudinal axis 38, and the linear cross-sectional shape may be non-parallel to the transverse plane 72. More specifically, the linear cross-sectional shape of the body mating surface 24 may converge towards the transverse plane 72 as the linear cross-sectional shape extends away from the longitudinal axis 38. The body mating surface 24 and the bonnet mating surface 32 may be symmetrically disposed about the transverse plane 72. That is, the angle that the linear cross-sectional shape of the body mating surface 24 forms with the transverse plane 72 may be equal or substantially equal with the angle that the linear cross-sectional shape of the bonnet mating surface 32 forms with the transverse plane 72. The body recess 20 may be further defined by a body recess end surface 78. The body recess end surface 78 may be a cylindrical surface that may be symmetrically formed about the longitudinal axis 38. The body recess end surface 78 may have a linear cross-sectional shape when viewed normal to the longitudinal axis 38, and the linear cross-sectional shape may be normal to the transverse plane 72. The bonnet recess end surface 74 may have the same diameter as the body recess end surface 78.

Figure 3:
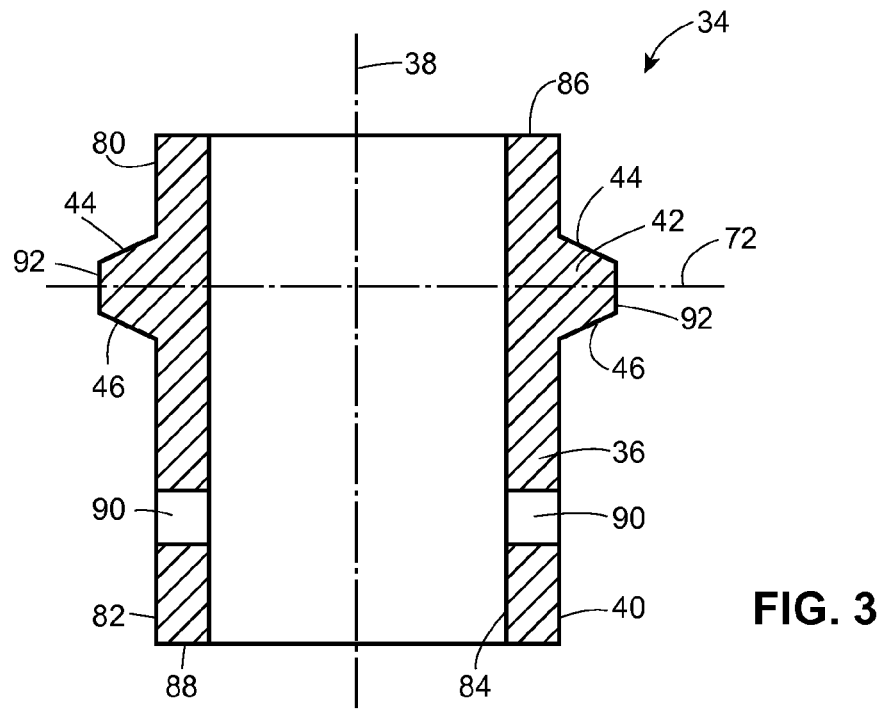
FIG. 3 is a partial sectional side view of a valve cage of the valve assembly of the present disclosure.

Referring to FIGS. 1, 2, and 3, the valve assembly 10 further includes the valve cage 34 that is disposed at least partially within the passageway 18. As illustrated in FIG. 3, the valve cage 34 may have an elongated body portion 36 extending along the longitudinal axis 38 such that the body portion 36 has a first end 80 and a second end 82 opposite the first end 80. The body portion 36 may include a cylindrical outer surface 40, and the outer surface 40 may be coaxially-aligned with the longitudinal axis 38. The diameter of the outer surface 40 may be slightly smaller than the diameter of each of the bonnet bore side surface 70 and the body bore side surface 76. The body portion 36 may also include a cylindrical inner surface 84 that is inwardly offset from and coaxial with the outer surface 40. A planar upper surface 86 may extend between the outer surface 40 and the inner surface 84 at the first end 80 of the body portion 36, and a planar lower surface 88 may extend between the outer surface 40 and the inner surface 84 at the second end 82 of the body portion 36. So configured, the body portion 36 may have the shape of a cylindrical sleeve, and the inner surface 84 may define a bore that extends through the valve cage 34 to receive the valve plug 54. One or more cage apertures 90 may extend from the inner surface 84 to the outer surface 40 to allow fluid to flow through the valve cage 34 when the valve plug 54 does not sealingly engage the valve seat 56.

Referring to FIGS. 2 and 3, the valve cage 34 further includes a circumferential mating protrusion 42 extending from the outer surface 40 in a direction along the transverse plane 72 (i.e., normal to the longitudinal axis 38). The mating protrusion 42 may extend around the entire circumference of the outer surface 40 of the valve cage 34. The mating protrusion 42 may include the upper mating surface 44 and the lower mating surface 46, and each of the upper mating surface 44 and the lower mating surface 46 may be symmetrically formed about the longitudinal axis 38. The upper mating surface 44 may have a linear cross-sectional shape when viewed normal to the longitudinal axis 38, and the linear cross-sectional shape may be non-parallel to the transverse plane 72. More specifically, the linear cross-sectional shape of the upper mating surface 44 may converge towards the transverse plane 72 as the linear cross-sectional shape extends away from the longitudinal axis 38. Instead of a linear cross-sectional shape, the upper mating surface 44 may have any suitable cross-sectional shape (e.g., curved or at least partially curved). The upper mating surface 44 of the mating protrusion 42 may be aligned with the bonnet mating surface 32 of the bonnet recess 28. For example, the linear cross-sectional shape of the upper mating surface 44 may form a first angle with the transverse plane 72, and the linear cross-sectional shape of the bonnet mating surface 32 may form the same first angle with the transverse plane 72. The first angle may be between 10 degrees and 45 degrees. Still other angles may prove suitable.

As illustrated in FIG. 2, the lower mating surface 46 may have a linear cross-sectional shape when viewed normal to the longitudinal axis 38, and the linear cross-sectional shape may be non-parallel to the transverse plane 72. More specifically, the linear cross-sectional shape of the lower mating surface 46 may converge towards the transverse plane 72 as the linear cross-sectional shape extends away from the longitudinal axis 38. The lower mating surface 46 of the mating protrusion 42 may be aligned with the body mating surface 24 of the body recess 20. For example, the linear cross-sectional shape of the lower mating surface 46 may form a first angle with the transverse plane 72, and the linear cross-sectional shape of the body mating surface 24 may form the same first angle with the transverse plane 72. The first angle may be between 10 degrees and 45 degrees. Again, still other angles may prove suitable. The upper mating surface 44 and the lower mating surface 46 may be symmetrically disposed about the transverse plane 72. That is, the angle that the linear cross-sectional shape of the upper mating surface 44 forms with the transverse plane 72 may be equal or substantially equal with the angle that the linear cross-sectional shape of the lower mating surface 46 forms with the transverse plane 72. Instead of a linear cross-sectional shape, the lower mating surface 46 may have any suitable cross-sectional shape (e.g., curved or at least partially curved).

Still referring to FIG. 3, the mating protrusion 42 may be further defined by a protrusion end surface 92 that extends between the upper mating surface 44 and the lower mating surface 46. The protrusion end surface 92 may be a cylindrical surface that may be symmetrically formed about the longitudinal axis 38. The protrusion end surface 92 may have a linear cross-sectional shape when viewed normal to the longitudinal axis 38, and the linear cross-sectional shape may be normal to the transverse plane 72 (i.e., parallel to the longitudinal axis 38). Because the upper mating surface 44 and the lower mating surface 46 of the mating protrusion 42 each converge as the upper mating surface 44 and the lower mating surface 46 extend away from the longitudinal axis 38, the angle between the linear cross-sectional shape of the upper mating surface 44 and the linear cross-sectional shape of the protrusion end surface 92 is an obtuse first angle. Because the mating protrusion 42 may be symmetrical about the transverse plane 72, the angle between the linear cross-sectional shape of the lower mating surface 46 and the linear cross-sectional shape of the protrusion end surface 92 is an obtuse second angle, and the obtuse second angle may be equal to the obtuse first angle. A variety or range of angles may prove suitable for the obtuse first and second angles. As illustrated in FIG. 2, the bonnet recess end surface 74 and the body recess end surface 78 may have a slightly larger diameter than the protrusion end surface 92. However, the bonnet recess end surface 74 and the body recess end surface 78 may have a diameter that is substantially equal to the protrusion end surface 92 such that contact between the protrusion end surface 92 and the bonnet recess end surface 74 and the body recess end surface 78 prevents the valve cage from displacing in the transverse direction relative to the bonnet 26 and/or the valve body 12.

As illustrated in FIGS. 1 and 2, the valve cage 34 may be disposed at least partially within the passageway 18 such that a top portion of the mating protrusion 42 is received into the bonnet recess 28 and a bottom portion of the mating protrusion 42 is received into the body recess 20. More specifically, the upper mating surface 44 of the mating protrusion 42 may be disposed within the bonnet recess 28 such that the upper mating surface 44 is aligned with and adjacent to (or in contact with) the bonnet mating surface 32. The lower mating surface 46 of the mating protrusion 42 may be disposed within the body recess 20 such that the lower mating surface 46 is aligned with and adjacent to (or in contact with) the body mating surface 24. As previously explained, a small gap may exist between the protrusion end surface 92 and each of the bonnet recess end surface 74 and the body recess end surface 78. With the mating protrusion 42 disposed as described, the planar upper surface 86 disposed at the first end 80 of the body portion 36 may be parallel to and offset from a planar bonnet bore top surface 94. Additionally, the cylindrical outer surface 40 may be slightly offset from each of the body bore side surface 76 and the bonnet bore side surface 70. A circumferential portion of the body portion 36 of the valve cage 34 that is at or adjacent to the second end 82 may engage a portion of the valve seat 56 and/or a portion of the valve body 12 adjacent to the valve seat 56. So arranged, the cylindrical inner surface 84 of the valve cage 34 may receive the valve plug 54 to prevent or limit transverse displacement of the valve plug 54 (and the valve stem 50 coupled to the valve plug 54), as would be understood by one having ordinary skill in the art.

Figure 4:
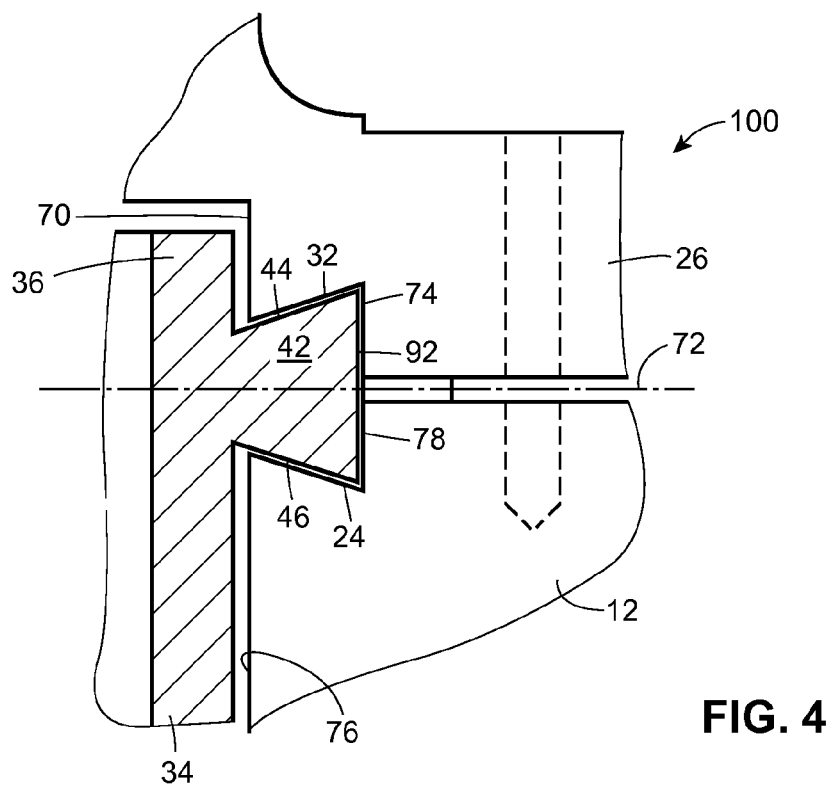
FIG. 4 is a partial sectional side view of a further embodiment of a valve assembly of the present disclosure.

In a further embodiment of the valve assembly 100 illustrated in FIG. 4, the valve assembly 100 may be substantially identical to the valve assembly 10 described above with the only exception being that the upper mating surface 44 and the lower mating surface 46 of the mating protrusion 42 each diverge as the upper mating surface 44 and the lower mating surface 46 extend away from the longitudinal axis 38. As such, the angle between the linear cross-sectional shape of the upper mating surface 44 and the linear cross-sectional shape of the protrusion end surface 92 is an acute first angle. Because the mating protrusion 42 may be symmetrical about the transverse plane 72, the angle between the linear cross-sectional shape of the lower mating surface 46 and the linear cross-sectional shape of the protrusion end surface 92 is an acute second angle, and the acute second angle may be equal to the acute first angle.

Still referring to FIG. 4, the upper mating surface 44 of the mating protrusion 42 may be aligned with the bonnet mating surface 32 of the bonnet recess 28. That is, the linear cross-sectional shape of the upper mating surface 44 may form a first angle with the transverse plane 72, and the linear cross-sectional shape of the bonnet mating surface 32 may form the same first angle with the transverse plane 72. The lower mating surface 46 of the mating protrusion 42 may be aligned with the body mating surface 24 of the body recess 20. That is, the linear cross-sectional shape of the lower mating surface 46 may form a first angle with the transverse plane 72, and the linear cross-sectional shape of the body mating surface 24 may form the same first angle with the transverse plane 72. The body mating surface 24 and the bonnet mating surface 32 may be symmetrically disposed about the transverse plane 72. That is, the angle that the linear cross-sectional shape of the body mating surface 24 forms with the transverse plane 72 may be equal or substantially equal with the angle that the linear cross-sectional shape of the bonnet mating surface 32 forms with the transverse plane 72.

Figure 5:
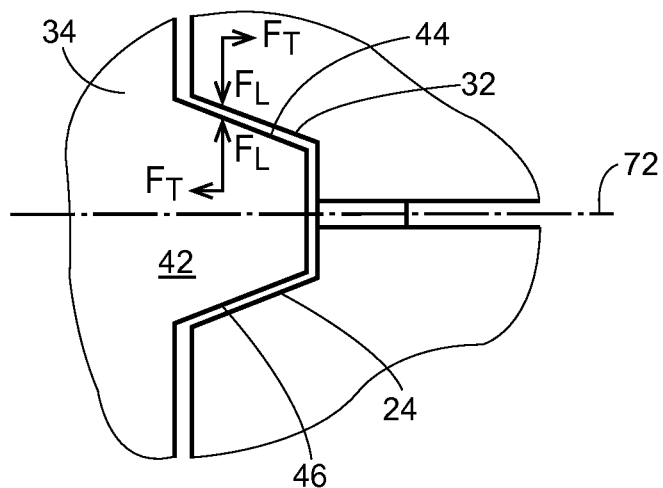
FIG. 5 is a partial sectional side view of the embodiment of the valve assembly illustrated in FIG. 4 illustrating longitudinal and transverse force components acting on the mating protrusion and the bonnet recess.

One having ordinary skill in the art would recognize the force provided by the fasteners 66 clamps the top portion of the mating protrusion 42 into the bonnet recess 28 and the bottom portion of the mating protrusion 42 into the body recess 20. When the clamping force acts on surfaces that are parallel to the transverse plane 72 (such as in conventional valve cage assemblies), the maximum allowable clamping force must be less than the maximum force that can be applied to the material without resulting in plastic deformation of the material (i.e., the yield force). In the valve assembly 10, 100 of the present disclosure, the bonnet mating surface 32 and the upper mating surface 44 are disposed at an angle relative to the transverse plane 72, and therefore both a longitudinal force component $F_L$ and a transverse force component $F_T$ act on the upper mating surface 44, as illustrated in FIG. 5. As such, the longitudinal force component $F_L$ may be less than the yield force (resulting in only elastic deformation of the upper mating surface 44), but the addition of the transverse force component $F_T$ vector allows the total resultant clamping force to be substantially greater than the yield force, thereby resulting in an increased safety factor. In addition, one having ordinary skill in the art would recognize that the total clamping force can be reduced (that is, the number or size of the bolts used to couple the bonnet 26 to the valve body 12) without compromising the seal between the bonnet 26 and the valve body 12. This reduction extends the service life of the valve components without resulting in increased costs or decreased function.

Figure 6:
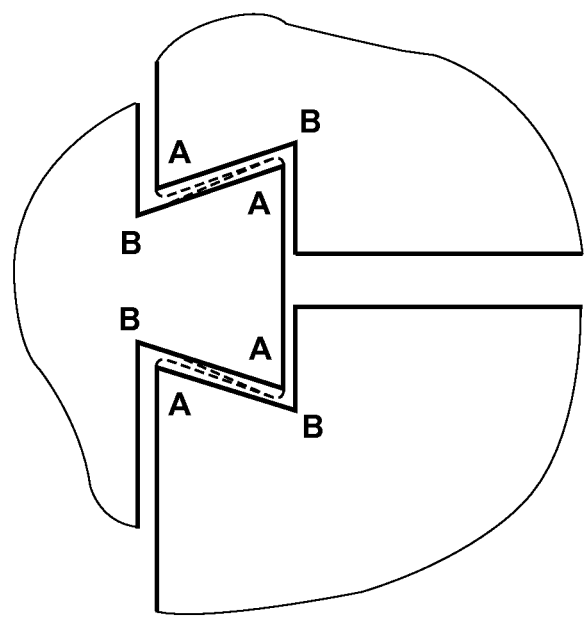
FIG. 6 is a partial sectional side view of the embodiment of the valve assembly illustrated in FIG. 4 illustrating areas subject to thermal expansion.

As illustrated in FIG. 6, in extreme thermal conditions, thermal expansion of portions of the body mating surface 24, the bonnet mating surface 32, the upper mating surface 44, and the lower mating surface 46 (with the expansion indicated by broken lines) may also improve sealing between these mating surfaces 24, 32, 44, 46. Specifically, portions of the mating surfaces 24, 32, 44, 46 at first locations (designated by A) will expand more than portions of the surfaces 24, 32, 44, 46 at second locations (designated by 8) thereby creating "pinch zones" at the point or points of surface contact due to expansion. This controlled expansion at particular portions of the mating surfaces 24, 32, 44, 46 to create the pinch zones allows for greater sealing pressure when the first locations expand to meet the second locations.

While various embodiments have been described above, this disclosure is not intended to be limited thereto. Variations can be made to the disclosed embodiments that are still within the scope of the appended claims. For example, the bonnet recess 28 may be formed in any suitable first portion of the control valve, and the body recess 20 may be formed in any suitable second portion of the control valve.

What is claimed is:

1. A valve assembly comprising:
a valve body having an inlet, an outlet, a passageway between the inlet and the outlet, and an annular body recess formed on a top portion of the valve body, the body recess including a body mating surface;
a bonnet removably secured to the top portion of the valve body, the bonnet having an annular bonnet recess formed on a bottom portion of the bonnet, the bonnet recess including a bonnet mating surface;
a valve cage disposed at least partially within the passageway, the valve cage having an elongated body portion extending along a longitudinal axis and having an outer surface, the valve cage also having a circumferential mating protrusion extending from the outer surface along a transverse plane that is normal to the longitudinal axis, the mating protrusion including an upper mating surface and a lower mating surface,
wherein the upper mating surface of the mating protrusion is disposed within the bonnet recess such that the upper mating surface is aligned with and adjacent to the bonnet mating surface,
wherein the lower mating surface of the mating protrusion is disposed within the body recess such that the lower mating surface is aligned with and adjacent to the body mating surface,
and wherein the upper mating surface and the lower mating surface of the mating protrusion either both converge or both diverge towards the transverse plane as the upper mating surface and the lower mating surface extend away from the longitudinal axis.

2. The valve assembly of claim 1, wherein the upper mating surface, the lower mating surface, the body mating surface, and the bonnet mating surface each has a linear cross-sectional shape when viewed normal to the longitudinal axis.

3. The valve assembly of claim 2, wherein the linear cross-sectional shape of the upper mating surface and the linear cross-sectional shape of the bonnet mating surface each forms a first angle with the transverse plane, and the linear cross-sectional shape of the lower mating surface and the linear cross-sectional shape of the body mating surface each forms a second angle with the transverse plane.

4. The valve assembly of claim 1, wherein the outer surface of the valve cage is cylindrical, and wherein the cylindrical outer surface is coaxially aligned with the longitudinal axis.

5. The valve assembly of claim 1, wherein the upper mating surface and the lower mating surface are symmetrical formed about the transverse plane.

6. The valve assembly of claim 1, wherein a cylindrical protrusion end surface extends between the upper mating surface and the lower mating surface of the mating protrusion, and the cylindrical protrusion end surface is coaxially aligned with the longitudinal axis.

7. The valve assembly of claim 1, wherein the bonnet is removably secured to the valve body by a plurality of bolts.

8. The valve assembly of claim 7, wherein a bonnet flange is formed adjacent to the bottom portion of the bonnet, the bonnet flange including a plurality of apertures, wherein a plurality of body apertures is formed in the top portion of the valve body, and wherein each of the plurality of apertures of the bonnet flange is coaxially aligned with a corresponding one of the plurality of body apertures such that each of the plurality of bolts is received into one of the plurality of apertures of the bonnet flange and the corresponding one of the plurality of body apertures.

9. The valve assembly of claim 1, wherein the mating protrusion extends around the entire circumference of the outer surface of the valve cage.

10. A valve cage adapted to be disposed at least partially within a passageway of a control valve, the valve cage comprising:
   a body portion extending along a longitudinal axis such that the body portion has a first end and a second end that is longitudinally separated from the first end, the body portion having an outer surface and an inner surface inwardly offset from the outer surface;
   a mating protrusion extending from the outer surface along a transverse plane that is normal to the longitudinal axis, the mating protrusion including an upper mating surface and a lower mating surface,
   wherein the upper mating surface of the mating protrusion is adapted to be disposed within a first recess formed in a first portion of the control valve such that the upper mating surface is aligned with and adjacent to a mating surface of the first recess,
   wherein the lower mating surface of the mating protrusion is adapted to be disposed within a second recess formed in a second portion of the control valve such that the lower mating surface is aligned with and adjacent to a mating surface of the second recess,
   and wherein the upper mating surface and the lower mating surface of the mating protrusion either both converge or both diverge towards the transverse plane as the upper mating surface and the lower mating surface extend away from the longitudinal axis.

11. The valve cage of claim 10, wherein the upper mating surface, the lower mating surface, the mating surface of the first recess, and the mating surface of the second recess each has a linear cross-sectional shape when viewed normal to the longitudinal axis.

12. The valve cage of claim 10, wherein the outer surface of the valve cage is cylindrical, and wherein the cylindrical outer surface is coaxially aligned with the longitudinal axis.

13. The valve cage of claim 10, wherein the upper mating surface and the lower mating surface are symmetrical formed about the transverse plane.

14. The valve cage of claim 10, wherein a cylindrical protrusion end surface extends between the upper mating surface and the lower mating surface of the mating protrusion, and the cylindrical protrusion end surface is coaxially aligned with the longitudinal axis.

15. The valve cage of claim 10, wherein the first recess is formed on a bottom portion of the bonnet and the second recess is formed on a top portion of the valve body.

* * * * *